United States Patent
Greenwood

(10) Patent No.: US 10,404,180 B2
(45) Date of Patent: Sep. 3, 2019

(54) DRIVER CIRCUIT FOR SWITCH

(71) Applicant: Power Integrations, Inc., San Jose, CA (US)

(72) Inventor: John David Greenwood, Bassingbourn (GB)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/977,790

(22) Filed: May 11, 2018

(65) Prior Publication Data

US 2018/0351468 A1 Dec. 6, 2018

Related U.S. Application Data

(60) Provisional application No. 62/514,492, filed on Jun. 2, 2017.

(51) Int. Cl.
*H02M 1/00* (2006.01)
*H02M 3/335* (2006.01)

(52) U.S. Cl.
CPC ..... *H02M 3/33569* (2013.01); *H02M 3/3353* (2013.01); *H02M 3/33507* (2013.01); *H02M 3/33576* (2013.01); *H02M 2001/0006* (2013.01)

(58) Field of Classification Search
CPC .......... H02M 3/33592; H02M 3/1588; H02M 3/33569; H02M 3/3353
USPC ............................. 323/267; 363/21.06, 21.14
See application file for complete search history.

(56) References Cited

U.S. PATENT DOCUMENTS

| | | | |
|---|---|---|---|
| 6,650,060 B2 | 11/2003 | Okuda | |
| 7,102,202 B2 | 9/2006 | Kobayashi et al. | |
| 7,109,952 B2 | 9/2006 | Kwon | |
| 7,405,595 B2 | 7/2008 | Yang et al. | |
| 2005/0083270 A1 | 4/2005 | Miyazawa | |
| 2007/0046105 A1* | 3/2007 | Johnson | H02M 3/33561 307/29 |
| 2008/0158110 A1 | 7/2008 | Iida et al. | |
| 2012/0106256 A1* | 5/2012 | Meier | H03K 17/063 365/185.18 |
| 2013/0241601 A1* | 9/2013 | Chen | H03K 17/063 327/108 |
| 2014/0112031 A1* | 4/2014 | Chen | H02M 3/33592 363/21.14 |

(Continued)

OTHER PUBLICATIONS

Stevens, John, "Using a Single-Output Gate Driver for High-Side or Low-Side Drive", Mar. 2013.

*Primary Examiner* — Alex Torres-Rivera
(74) *Attorney, Agent, or Firm* — Andrew J. Borja

(57) ABSTRACT

A driver circuit for use in a controller includes a signal generator coupled to generate a first control signal, a second control, and a third control signal in response to a drive signal that is coupled to control switching of a selection switch that is coupled to the driver circuit and referenced to an output voltage that is greater than a ground reference voltage. A first switch is coupled to selectively couple a first voltage to a first terminal of the controller in response to the first control signal. A second switch is coupled to selectively couple a second voltage to a second terminal of the controller in response to the second control signal. A third switch is coupled to selectively couple the second terminal of the controller to a third terminal of the controller in response to the third control signal.

21 Claims, 5 Drawing Sheets

(56) References Cited

U.S. PATENT DOCUMENTS

2018/0212528 A1* 7/2018 Tang ................. H02M 3/33592

* cited by examiner

DRIVER CIRCUIT FOR SWITCH

CROSS-REFERENCE TO RELATED APPLICATIONS

This application claims the benefit of U.S. Provisional Application No. 62/514,492 filed on Jun. 2, 2017, the contents of which are incorporated herein by reference.

BACKGROUND INFORMATION

Field of the Disclosure

The present invention relates generally to power converters, and more specifically to multi-output power converters.

Background

Electronic devices (such as cell phones, tablets, laptops, etc.) use power to operate. Switched mode power converters are commonly used due to their high efficiency, small size, and low weight to power many of today's electronics. Conventional wall sockets provide a high voltage alternating current. In a switching power converter, a high voltage alternating current (ac) input is converted to provide a well-regulated direct current (dc) output through an energy transfer element to a load. In operation, a switch is turned ON and OFF to provide the desired output by varying the duty cycle (typically the ratio of the on time of the switch to the total switching period), varying the switching frequency, or varying the number of on/off pulses per unit time of the switch in a switched mode power converter.

The energy transfer element may have one or more primary windings coupled to the input side of the power converter and one or more secondary windings coupled to the output side of the power converter. For a multi-output power converter, there is generally a secondary winding for each output of the power converter and an associated output switch, which may be controlled to transfer the appropriate amount of power to each output of the power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
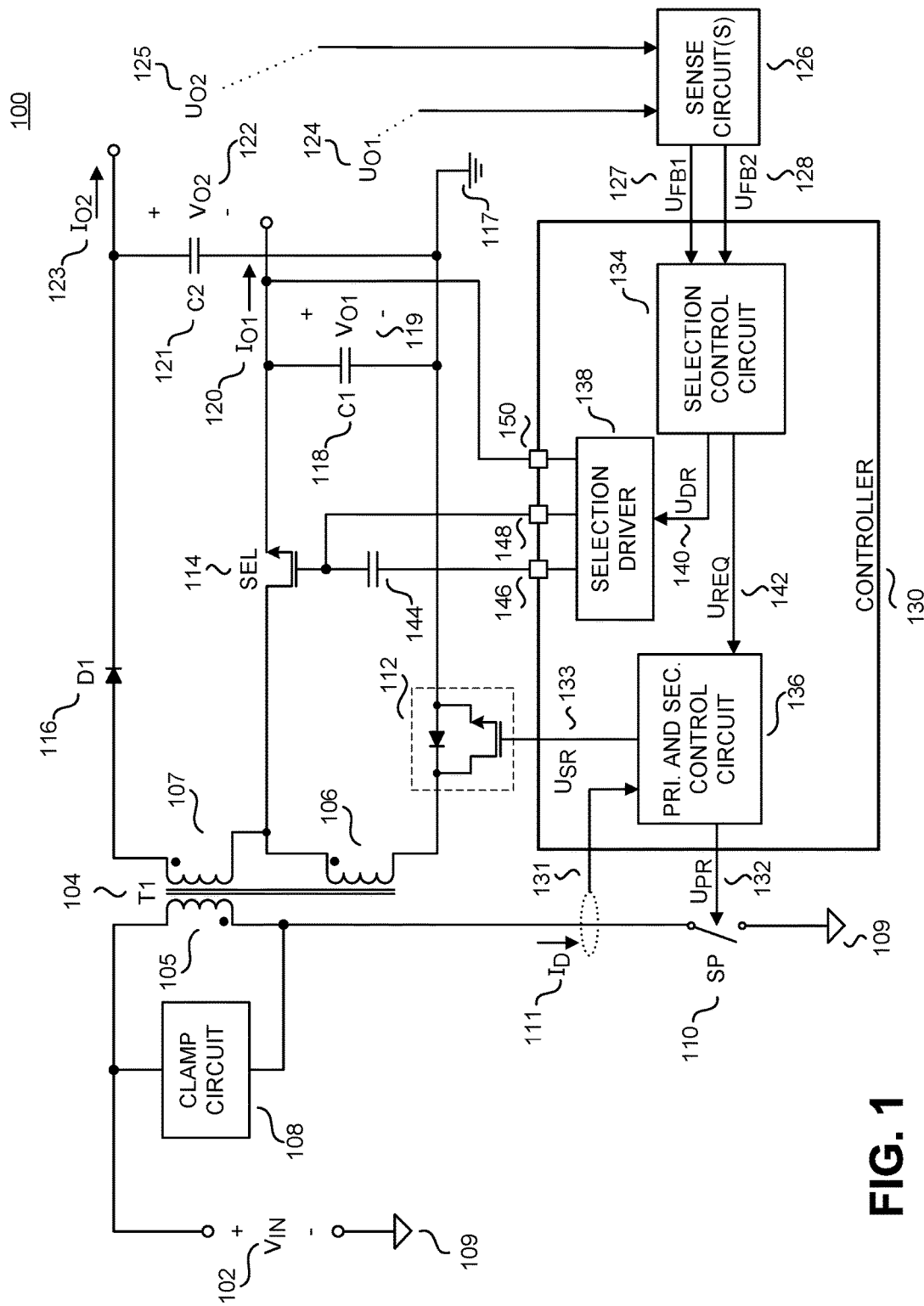
FIG. 1 illustrates one example of a power converter in a multi-output flyback configuration and controller, in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For each output of a multi-output power converter there may an associated output switch, which may be referred to as a selection switch or a selection field effect transistor (selFET), which controls the transfer of the appropriate amount of power to the particular output of the power converter. In addition, power converters may employ a high-side secondary switch which are referenced to the output of the power converter. Metal-oxide-semiconductor field effect transistors (MOSFETs) may be used for these output switches. The MOSFETs are coupled to a secondary winding and the applicable output of the power converter, with the drain of the MOSFET coupled to the secondary winding and the source coupled to the output. To turn on an n-type MOSFET, the voltage drop between the gate and the source should be greater than the threshold voltage of the MOSFET. Depending on the application, one or more of the outputs of the power converter may be 10V or greater and as such, a MOSFET may be referenced to a voltage that is 10V or greater. For the example of a MOSFET whose source is coupled to a 10V output, the gate should be driven with a voltage that is greater than 10V (the voltage at the source) plus the threshold voltage to turn on the MOSFET. The resultant gate voltage (the sum of the output voltage and the threshold voltage) to drive the MOSFET on may be difficult to provide. MOSFETs are also generally rated by how much gate-source voltage ($V_{GS}$) the MOSFET can handle. In general the greater the gate-source voltage ($V_{GS}$) which the MOSFET can handle, the more expensive the MOSFET.

Embodiments in accordance with the teachings of the present disclosure may include a selection driver circuit with a biasing capacitor to drive a switch, which is referenced to a non-zero voltage (such as the output of the power converter). The biasing capacitor is coupled to the control terminal (e.g., the gate) of the switch. The selection driver circuit includes driver switches that are controlled by a signal generator. The signal generator generates the control signals for the driver switches in response to the drive signal to turn on/off the switch referenced to the non-zero voltage. When the drive signal indicates that the switch should be turned off, the driver switches are controlled such that the biasing capacitor is charged to the non-zero reference voltage. In one example, the non-zero reference voltage is an output voltage. As such, prior to the switch being turned on, the gate/control terminal of the switch is charged to the same voltage as the source/reference terminal of the switch. When the drive signal indicates that the switch should be turned on, the driver switches are controlled such that a driving voltage is also applied to the biasing capacitor. Since the gate/control terminal of the switch is substantially equal to the source/reference terminal of the switch due to the biasing capacitor, the additional driving voltage provided by the driver circuit turns on the switch. As such, the selection driver circuit provides the driving voltage to turn on the switch. Without the biasing capacitor, other driver circuits would provide the sum of the driving voltage and non-zero reference voltage to turn on the switch. In addition, when a MOSFET is used for the switch, applying a voltage on the biasing capacitor such that the gate/control terminal is substantially equal to the voltage on the source/reference of the MOSFET allows for the use of a lower rated gate-source voltage MOSFET (e.g., cheaper MOSFET) as may otherwise have been required without the biasing. For example of a MOSFET which is referenced to, and does not include biasing, that MOSFET would typically be rated to have a gate-source voltage to withstand 10V.

To illustrate, FIG. 1 shows a functional block diagram of an example power converter 100 in a multi-output flyback configuration including a controller 130 with a selection driver 138 in accordance with the teachings of the present disclosure. The example of the power converter 100 includes an energy transfer element 104, a primary winding 105 of the energy transfer element 104, secondary windings 106 and 107 of the energy transfer element 104, a clamp circuit 108, a power switch SP 110, an input return 109, output rectifiers 112 and 116, a selection switch 114, output capacitors C1 118 and C2 121, sense circuit(s) 126, and a biasing capacitor 144. The controller 130 is shown as including a selection control circuit 134, primary and secondary control circuit 136, a selection driver 138, and terminals 146, 148, and 150. Also shown in FIG. 1 are an input voltage $V_{IN}$ 102, first and second output voltages $V_{O1}$ 119 and $V_{O2}$ 122, first and second output currents $I_{O1}$ 120, $I_{O2}$ 123, first and second output quantities $U_{O1}$ 12 and $U_{O2}$ 125, first and second feedback signals $U_{FB1}$ 127 and $U_{FB2}$ 128, a switch current $I_D$ 111, a current sense signal 131, a primary drive signal $U_{PR}$ 132, a secondary drive signal $U_{SR}$ 133, a drive signal $U_{DR}$ 140, and a request signal $U_{REQ}$ 142. In the illustrated example, the power converter 100 is shown as having a flyback topology. It is appreciated that other known topologies and configurations of power converters may also benefit from the teachings of the present disclosure.

The example power converter 100 can provide output power to two loads from an unregulated input voltage $V_{IN}$ 102, which may be a rectified and filtered ac line voltage or a dc input voltage. The input voltage $V_{IN}$ 102 is coupled to the energy transfer element 104. In some embodiments, the energy transfer element 104 may be a coupled inductor, a transformer, or an inductor. The example energy transfer element 104 shown in FIG. 1 includes three windings, a primary winding 105 and secondary windings 106 and 107. However, in other examples, the energy transfer element 104 may have more than two secondary windings and more than one primary winding. Coupled across the primary winding 105 is the clamp circuit 108, which limits the maximum voltage across the power switch SP 110. The primary winding 105 is further coupled to the power switch 110, and the power switch 110 is further coupled to input return 109.

The secondary winding 106 is coupled to the output rectifier 112, which is exemplified as a transistor used as a synchronous rectifier. Secondary winding 106 is also coupled to a switch 114, referred herein as a selection switch SEL 114, which is shown as an n-type MOSFET. Selection switch SEL 114 includes a first terminal coupled to secondary winding 106, and a second terminal coupled to output capacitor C1 118. Output capacitor C1 118 is shown as being coupled to the output rectifier 112 and output return 117 at one end, and is coupled to the second terminal of selection switch SEL 114 at the other end. The voltage across output capacitor C1 118 is the first output voltage $V_{O1}$ 119.

Secondary winding 107 is coupled to output rectifier 116, which is exemplified as a diode. Secondary winding 107 is also coupled to the first terminal of selection switch SEL 114. Output capacitor C2 is shown as being coupled to the output rectifier 116 on one end, and output return 117 at the other end. The voltage across output capacitor C1 118 is the first output voltage $V_{O1}$ 119 while the voltage across output capacitor C2 121 is the second output voltage $V_{O2}$ 122. Both of these output voltages, along with the output rectifier 112, are referenced to the output return 117. However, the second terminal of selection switch SEL 114 is not referenced to the output return 117, instead the selection switch SEL 114 is referenced to the high side of capacitor C1 118, e.g. the first output voltage $V_{O1}$ 119. In other words, the second terminal of selection switch SEL 114, which is the source terminal of selection switch SEL 114 in FIG. 1, is not coupled to a ground reference voltage (e.g., zero volts). Instead, the source terminal of selection switch SEL 114 is coupled to, or referenced to, an output voltage that is greater than a ground reference voltage such as zero volts. As a consequence, in order to turn on the selection switch SEL 114, the control terminal/gate terminal of the selection switch SEL 114 should be driven with a voltage greater than the sum of the first output voltage $V_{O1}$ 119 and the threshold voltage of the selection switch. As will be further discussed, the biasing capacitor 144 is coupled to the control terminal/gate terminal of the selection switch SEL 114 to bias the gate voltage of the selection switch SEL 114 to substantially the first output voltage $V_{O1}$ 119.

The power converter 100 further includes circuitry to regulate the output, which is exemplified as the first output quantity $U_{O1}$ 124 and second output quantity $U_{O2}$ 125. In general, the first output quantity $U_{O1}$ 124 is the first output voltage $V_{O1}$ 119, the first output current $I_{O1}$ 120, or a combination of the two while the second output quantity $U_{O2}$ is the second output voltage $V_{O2}$ 122, the second output current $I_{O2}$ 123, or a combination of the two. One or more sense circuit(s) 126 is coupled to sense the first and second output quantities $U_{O1}$ 124 and $U_{O2}$ 125, and to provide the first and second feedback signals $U_{FB1}$ 127 and $U_{FB2}$ 128, respectively, which are representative of the first and second output quantities $U_{O1}$ 124 and $U_{O2}$ 125.

As shown, the controller 130 is coupled to receive the first and second feedback signals $U_{FB1}$ 127 and $U_{FB2}$ 128. The controller 130 is also coupled to receive the current sense signal 131, representative of the drain current $I_D$ 111 of the power switch SP 110, and may be a voltage or current signal. In addition, the controller 130 provides the primary drive signal $U_{PR}$ 132 and the secondary drive signal $U_{SR}$ 133 to control various switching parameters of the power switch SP 110 and output rectifier 112, respectively, to control the transfer of power between the input of the power converter 100 through the energy transfer element 104 to the outputs of the power converter 100. Examples of such parameters may include switching frequency (or period), duty cycle, ON and OFF times of the power switch SP 110, or varying the number of pulses per unit time of the power switch SP 110.

Controller 130 includes the selection control circuit 134, primary and secondary control circuit 136, and the selection driver 138. The controller 130 may be implemented as a monolithic integrated circuit or may be implemented with discrete electrical components or a combination of discrete and integrated components. Controller 130 and power switch SP 110 could form part of an integrated circuit that is manufactured as either a hybrid or monolithic integrated circuit. Further, the controller 130 may be implemented as one or more integrated circuits that is manufactured as either a hybrid or monolithic integrated circuit. In addition, the controller 130 may be implemented as one or more packages, which include the one or more integrated circuits. For example, the selection control circuit 134 and the selection driver 138 may be integrated into one package, while the primary and secondary control circuit 136 may be included in another package. The packages may communicate to each other via a communication link. In addition, the primary and secondary control circuit 136 may be implemented as two separate integrated circuits which are housed in a single package. The two integrated circuits may also communicate via a communication link.

As shown, the selection control circuit 134 receives the first and second feedback signals $U_{FB1}$ 127 and $U_{FB2}$ 128, and outputs the request signal $U_{REQ}$ 142, which may be a voltage or current signal. In operation, the selection control circuit 134 determines if power should be transferred from the input to the output of the power converter 100 in response to the first and second feedback signals $U_{FB1}$ 127 and $U_{FB2}$ 128. The request signal $U_{REQ}$ 142 may be representative of a request to deliver power from the input of power converter 100. In other words, the request signal $U_{REQ}$ 142 is representative of a request to turn on the primary power switch SP 110. The primary and secondary control circuit 136 receives the request signal $U_{REQ}$ 142 (along with the current sense signal 131), and outputs the primary drive signal $U_{PR}$ 132 and the secondary drive signal $U_{SR}$ 133.

The selection control circuit 134 also outputs the drive signal $U_{DR}$ 140, which is a voltage or current signal that controls the switching of the selection switch SEL 114 in response to the first and second feedback signals $U_{FB1}$ 127 and $U_{FB2}$ 128. In operation, the selection control circuit 134 controls the selection switch SEL 114 such that an appropriate amount of power is provided to each output of the power converter 100. The selection driver 138 receives the drive signal $U_{DR}$ 140, and provides the signals that turn on and turn off the selection switch SEL 114 and biases the biasing capacitor 144 via terminals 146, 148, and 150. In one example, the drive signal $U_{DR}$ 140 is a rectangular waveform with varying lengths of logic high and logic low sections. Logic high sections may correspond to turning on the selection switch SEL 114, while logic low sections may correspond to turning off the selection switch SEL 114. An "on" switch (i.e., closed) may conduct current while an "off" switch (i.e., open) cannot conduct current.

As shown, the selection driver 138 is coupled to terminals 146, 148, and 150. Terminal 146 is coupled to one end of the biasing capacitor 144. Terminal 148 is coupled to the other end of biasing capacitor 144 and the control/gate terminal of the selection switch SEL 114. Terminal 150 is coupled to the high side of output capacitor C1 118 and the drain/reference terminal of selection switch SEL 114. In other words, terminal 150 is coupled to the output of the power converter and the first output voltage $V_{O1}$ 119, to which the selection switch SEL 114 is referenced.

In operation, the selection driver 138 receives the drive signal $U_{DR}$ 140 and couples the biasing capacitor 144 to the first output voltage $V_{O1}$ 119 when the drive signal $U_{DR}$ 140 indicates that the selection switch SEL 114 should be off. During the off-time of the drive signal $U_{DR}$ 140, the selection driver 138 couples together terminals 148 and 150, and the biasing capacitor 144 is charged to the first output voltage $V_{O1}$ 119. In other words, the gate/control terminal of the selection switch SEL 114 is biased to the same voltage as its source/reference terminal. When the drive signal $U_{DR}$ 140 indicates that the selection switch SEL 114 should be on, the selection driver 138 provides a drive voltage (which is greater than the threshold voltage of the selection switch SEL 114) to the selection switch SEL 114 through terminal 146. Since the gate/control terminal of the selection switch SEL 114 is biased to the same voltage as its source/reference terminal, the selection driver 138 can provide a lower drive voltage than what would otherwise be needed without biasing the gate/control terminal and the selection switch SEL 114 may be rated with a lowered gate-source voltage. Without biasing, other driver circuits would have to provide at least the sum of the output voltage and the threshold voltage of the switch as the drive voltage.

Figure 2:
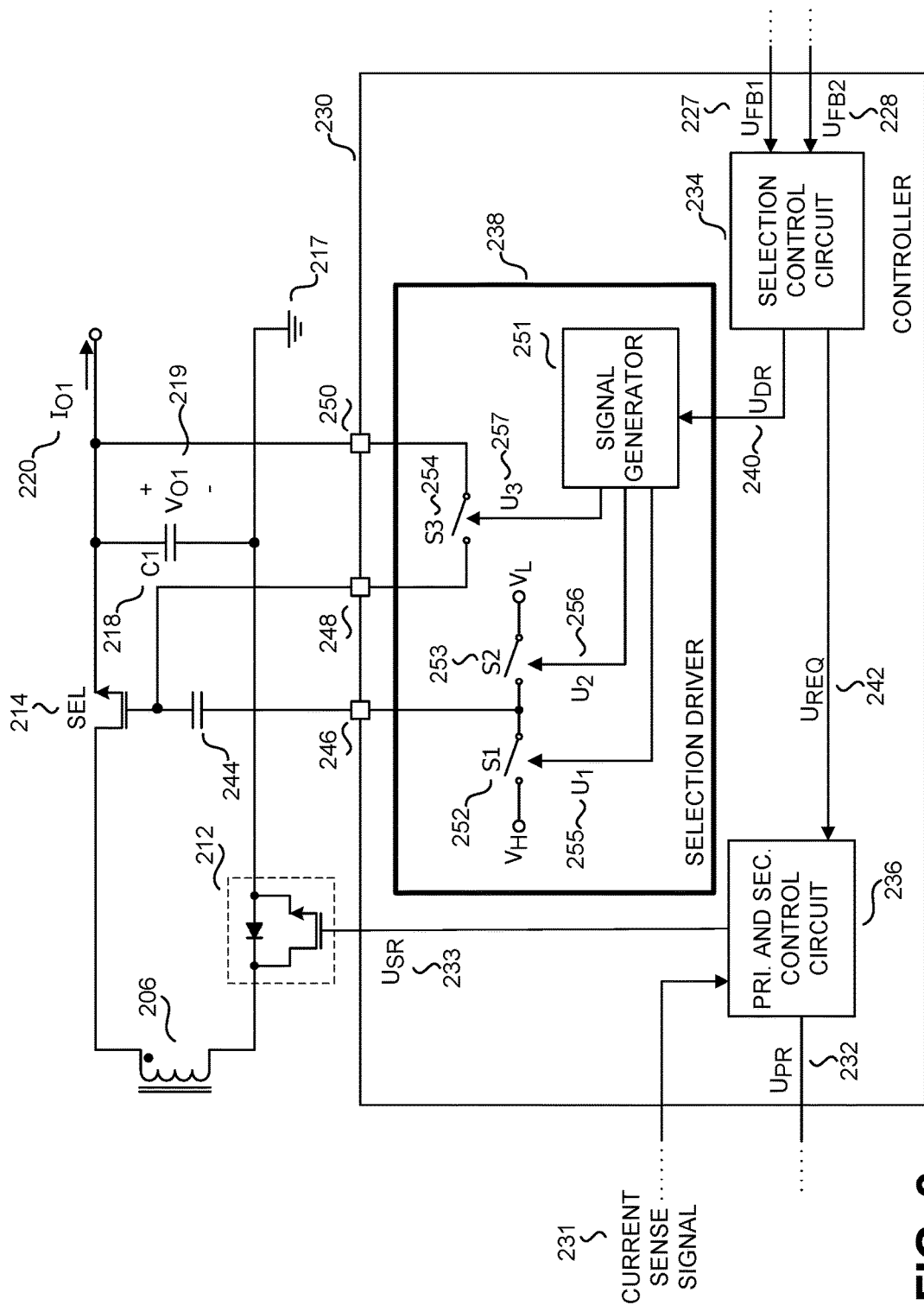
FIG. 2 illustrates one example of the controller of FIG. 1, in accordance with an embodiment of the present disclosure.

FIG. 2 illustrates controller 230, which is one example of controller 130 discussed with respect to FIG. 1. Controller 230 is shown as including the selection control circuit 234, primary and secondary control circuit 236, and the selection driver 238. The selection driver 238 is illustrated as including signal generator 251, and switches S1 252, S2 253, and S3 254. Switches S1 252, S2 253, and S3 254 may be implemented as MOSFETs. Further shown are voltage $V_H$ (drive voltage) and $V_L$, and signals $U_1$ 255, $U_2$ 256, and $U_3$ 257. Further shown in FIG. 2 are secondary winding 206, output rectifier 212, selection switch SEL 214, first output capacitor C1 218, output return 217, and terminals 246, 248, and 250. It should be appreciated that similarly named and numbered elements are coupled and function as described above.

As mentioned above, the selection control circuit 234 receives the first and second feedback signals $U_{FB1}$ 227 and $U_{FB2}$ 228, and outputs the request signal $U_{REQ}$ 242 and the drive signal $U_{DR}$ 240. In response to the first and second feedback signals $U_{FB1}$ 227 and $U_{FB2}$ 228, the selection control circuit 234 sends a request signal $U_{REQ}$ 242 to the primary and secondary control circuit 236 to request a turn on of the primary power switch SP. The primary and secondary control circuit 236 then outputs the primary drive signal $U_{PR}$ 232 and the secondary drive signal $U_{SR}$ 233 to control the transfer of energy from the input to the output of the power converter. The outputted drive signal $U_{DR}$ 240 controls the turning on and off of the selection switch SEL 214 such that an appropriate amount of power is provided to each output of the power converter 100.

The selection driver 238 receives the drive signal $U_{DR}$ 240 at the signal generator 251. The signal generator 251 outputs signals $U_1$ 255, $U_2$ 256, and $U_3$ 257, which control switches S1 252, S2 253, and S3 254, respectively, in response to the drive signal $U_{DR}$ 240. Signals $U_1$ 255, $U_2$ 256, and $U_3$ 257 are rectangular waveforms with varying lengths of logic high and logic low sections. In one example, a logic high value may correspond to an on (e.g., closed) switch, while a logic low value may correspond to an off (e.g., open) switch. The signal generator 251 may include a non-overlapping clock generator to generate signals $U_1$ 255, $U_2$ 256, and $U_3$ 257 such that their respective leading and trailing edges do not overlap. In addition, MOSFETs may be used for switches S1 252, S2 253, and S3 254. In another example, bipolar junction transistors (BJTs) could also be used.

As shown, one end of switch S1 252 is coupled to voltage $V_H$ (drive voltage), while the other end is coupled to the biasing capacitor 244 via terminal 246. One end of switch S2 is also coupled to the biasing capacitor 244 via terminal 246, while the other end is coupled to voltage $V_L$. When the switch S1 252 is turned on and switch S2 253 is turned off, the voltage at terminal 246 is substantially voltage $V_H$ (drive voltage). Conversely, when switch S2 253 is on and switch S1 252 is off, the voltage at terminal 246 is substantially voltage $V_L$. In one example, the voltage $V_H$ (drive voltage) is greater than the threshold voltage of the selection switch SEL 214, and the voltage $V_L$ is substantially equal to the ground reference voltage at output return 217. For example, the voltage $V_H$ (drive voltage) is substantially 5V, while the voltage $V_L$ is substantially 0V. As such, the voltage at the gate/control terminal of the selection switch SEL 214 is the sum of the voltage across biasing capacitor 244 and either the voltage $V_H$ (drive voltage) or the voltage $V_L$.

Switch S3 254 is coupled between the gate/control terminal of the selection switch SEL 214 via terminal 248 and the first output voltage $V_{O1}$ 219 via terminal 250. In addition, the switch S3 254 is also coupled to the source/reference terminal of the selection switch SEL 214 via terminal 250. When switch S3 254 is on, terminals 248 and 250 are coupled together. As such, the gate/control terminal of the selection switch SEL 214 is coupled to the output of the power converter and the first output voltage $V_{O1}$ 219 (which is the same voltage to which the source/reference terminal of the selection switch SEL 214 is referenced). If switch S2 253 is also on and voltage $V_L$ is substantially equal to output return 217, the biasing capacitor 244 would be charged to the first output voltage $V_{O1}$ 219.

In operation, when the signal generator 251 receives a logic low value for the drive signal $U_{DR}$ 240 (indicating that selection switch SEL 214 should be off), the signal generator 251 outputs signals $U_2$ 256 and $U_3$ 257 to turn on switches S2 253 and S3 254, respectively, and outputs signal $U_1$ 255 to turn off switch S1 252. As such, the biasing capacitor is coupled to the output of the power converter. In the example shown, the biasing capacitor is coupled to the first output capacitor C1 218. If the voltage $V_L$ is substantially equal to output return 217, the biasing capacitor 244 is charged to substantially the first output voltage $V_{O1}$ 219. Since the voltage at the gate/control terminal is substantially equal to the voltage at the source/reference terminal of switch SEL 214, switch SEL 214 is turned off and remains off.

When the signal generator 251 receives a logic high value for the drive signal $U_{DR}$ 240 (indicating that selection switch SEL 214 should be on), the signal generator outputs signal $U_1$ 255 to turn on switch S1 252, and outputs signals $U_2$ 256 and $U_3$ 257 to turn off switches S2 254 and S3 254, respectively. As such, the voltage at node 246 is substantially voltage $V_H$ (drive voltage). However, since the biasing capacitor 244 was precharged to the first output voltage $V_{O1}$ 219 while the switch SEL 214 was off, the voltage applied at the gate/control terminal of selection switch SEL 214 is the sum of the voltage across the biasing capacitor 244 (which would be substantially equal to first output voltage $V_{O1}$ 219) and the voltage $V_H$. As such, the switch SEL 214 is turned on and remains on.

Figure 3:
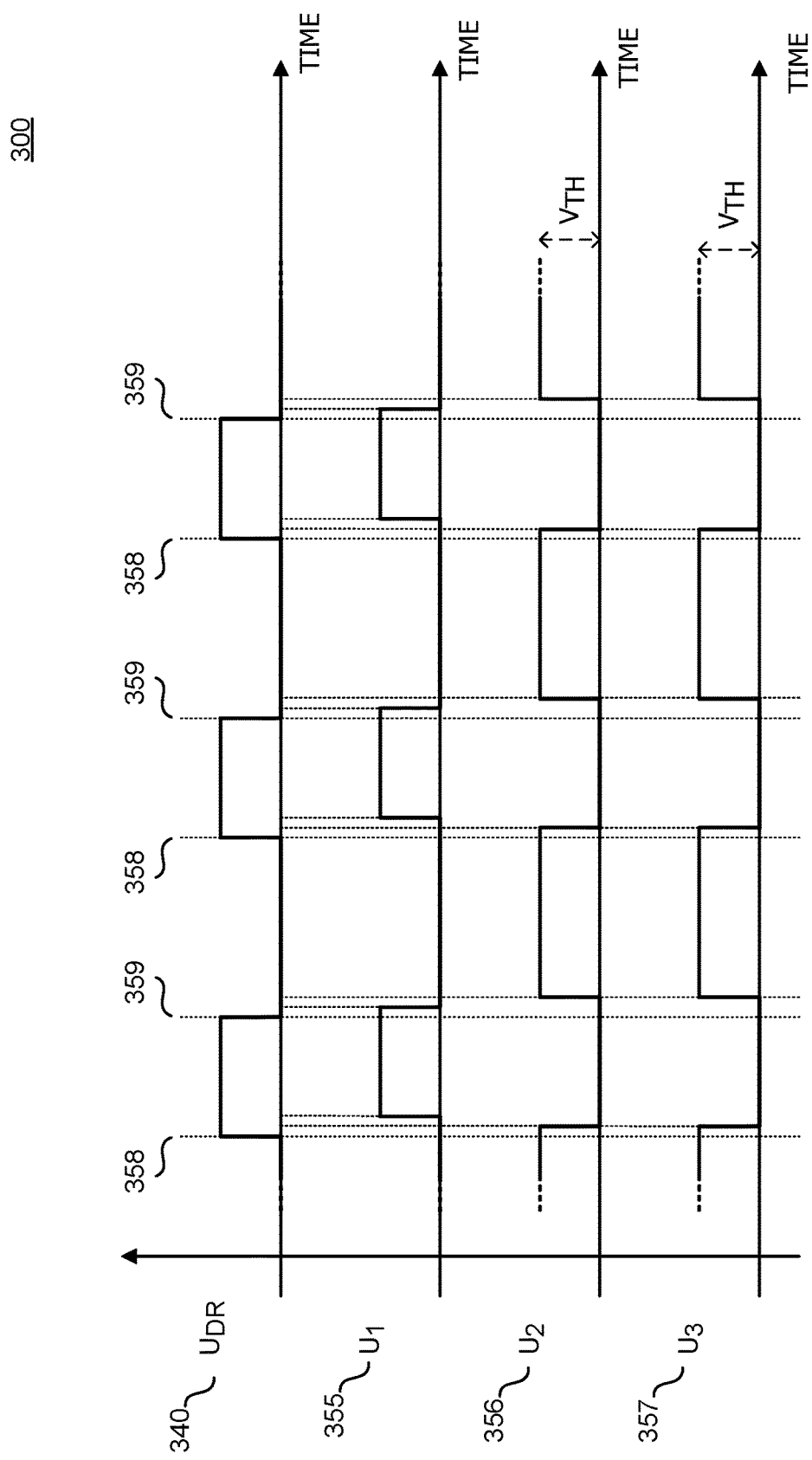
FIG. 3 illustrates an example timing diagram of various signals of the controller of FIG. 2, in accordance with an embodiment of the present disclosure.

FIG. 3 illustrates a timing diagram 300 of example drive signal $U_{DR}$ 340, and signals $U_1$ 355, $U_2$ 356, and $U_3$ 357. For every leading edge 358 of the drive signal $U_{DR}$ 340, signals $U_2$ 356 and $U_3$ 357 fall to a logic low value prior to the signal $U_1$ 355 rising to a logic high value. As shown in FIG. 3, there is a delay after the leading edges 358 of drive signal $U_{DR}$ 340 for the trailing edge of signals $U_2$ 356 and $U_3$ 357. There is another delay after the trailing edge of signals $U_2$ 356 and $U_3$ 357 for the leading edge of signal $U_1$ 355. As such, switches S1, S2, and S3 discussed above are not all on at the same time. In one example, each delay may be about 5 nanoseconds (ns).

For every trailing edge 359 of the drive signal $U_{DR}$ 340, signal $U_1$ 355 falls to a logic low value prior to signals $U_2$ 356 and $U_3$ 357 rising to a logic high value. In the figure shown, there is a delay after the trailing edges 359 for the trailing edge of signal $U_1$ 355. There is another delay after the trailing edge of signal $U_1$ 355 for the leading edge of signals $U_2$ 356 and $U_3$ 357. Similar to the leading edge 358, the delays may be about 5 ns. The characteristics of signals $U_2$ 356 and $U_3$ 357 are substantially the same, however signal $U_3$ 357 is a level shifted version of signal $U_2$ 356. As shown in FIG. 3, both the amplitude of signals $U_2$ 356 and $U_3$ 357 are substantially equal to voltage $V_{TH}$. However, signal $U_2$ 356 may be referenced to output return (117/217), and $U_3$ 357 may be referenced to the first output voltage $V_{O1}$ (119/219). In other words, the logic low level of signal $U_2$ 356 may be substantially equal to the voltage of output return (117/217) and the logic low level of signal $U_3$ 357 may be substantially equal to the first output voltage $V_{O1}$ (119/219). Drive signal $U_{DR}$ 340 and signal $U_1$ 355 may also be referenced to output return (117/217).

Figure 4:
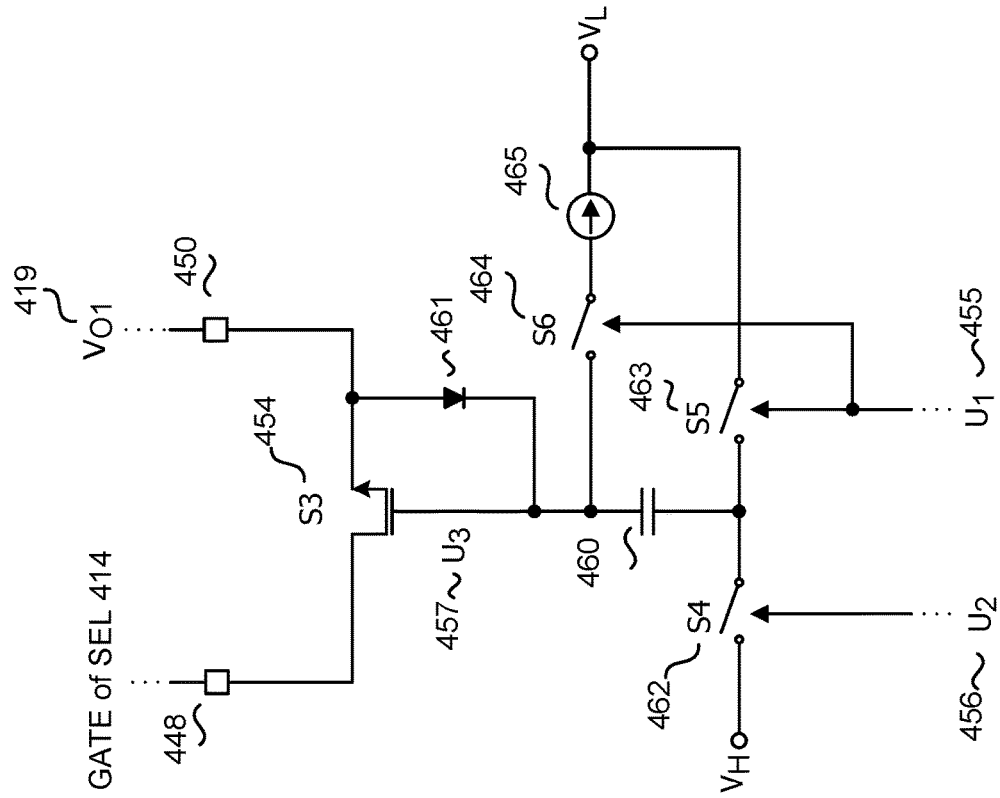
FIG. 4 illustrates one example of a portion of a signal generator of FIG. 2, in accordance with an embodiment of the present disclosure.

FIG. 4 illustrates a portion 400 of the signal generator which generates the signal $U_3$ 457 to control switch S3 454 of the selection driver. The portion 400 of the selection driver is shown as including a biasing capacitor 460, a diode 461, switches S4, 462, S5 463, and S6 464, and current source 465. Also illustrated in FIG. 4 are terminals 448 and 450, and signals $U_1$ 455, $U_2$ 456, and $U_3$ 457. Similar to the previous figures, terminal 448 is coupled to the gate of a selection switch SEL 414, which may be an example of selection switch SEL 214 of FIG. 2, while terminal 450 is coupled to the first output voltage $V_{O1}$ 419. It should be appreciated that similarly named and numbered elements are coupled and function as described above.

Switch S3 454 of the selection driver is also a switch that is referenced to a non-zero voltage (its source/reference is coupled to a non-zero voltage). The portion 400 that generates the signal U3 457 to switch S3 454 is similar to the example selection driver shown in FIG. 2 that controls the selection switch SEL 214. However, instead of an active switch (i.e., switch S3 in FIG. 2) coupled between the gate/control and the source/reference, a passive switch (diode 461) may be used instead as shown. The passive switch is exemplified as diode 461 and it should be appreciated that other diodes, such as a Zener or Schottky diode could also be used. There is also an additional switch S6 464 and current source 465, which may be used to facilitate turning off the switch S3 454 quickly.

As shown, the switch S3 454 is exemplified as an n-type MOSFET, and the signal $U_3$ 457 is received at the gate of switch S3 454. Biasing capacitor 460 is also coupled to the gate of switch S3 454. One end of switch S4 462 is coupled to voltage $V_H$ (driving voltage), while the other end is coupled to the biasing capacitor 460. Similarly, one end of switch S5 463 is coupled to the biasing capacitor 460, while the other end is coupled to voltage $V_L$. Signals $U_2$ 456 and $U_1$ 455 control the turning on and off of switches S4 462 and S3 463, respectively. One end of switch S6 464 is coupled to biasing capacitor 460 and the gate of switch S3 454, while the other end is coupled to current source 465. Current source 465 is further coupled to voltage $V_L$. Signal $U_1$ 455 also controls the turn on and off of switch S6 464. Diode 461 is coupled between the gate and source of switch S3 454. As shown, the anode end of diode 461 is coupled to the source of switch S3 454 (and terminal 450/first output voltage $V_{O1}$ 419), while the cathode end of diode 461 is coupled to the gate of switch S3 454 (and biasing capacitor 460).

In operation, switch S3 454 is turned off when signal $U_2$ 462 is logic low and signal $U_1$ 455 is logic high, which results in a logic low signal $U_3$ 457. When the switch S3 454 is turned off, the biasing capacitor 460 is charged such that the voltage across the biasing capacitor 460 is substantially the difference between the first output voltage $V_{O1}$ 419 and the voltage drop $V_D$ of diode 461 (mathematically: $V_{O1}$-$V_D$). In other words, the voltage at the gate of switch S3 454 is the difference between the first output voltage $V_{O1}$ 419 and the voltage drop $V_D$. The biasing capacitor 460 is an internal capacitor (integrated with the controller) and is much smaller than biasing capacitor (144/244) shown in FIGS. 1 and 2 that is external to the controller. Further, switch S3 is also a MOSFET that is internal to the controller and as such, the intrinsic threshold voltage of switch S3 454 is low enough such that using the diode 461 may adequately pre-charge the gate of switch S3 454/biasing capacitor 460. In addition, switch S6 464 is conducting and current source 465 is used as a pulldown current source to ensure that switch S3 454 remains off to combat possible leakage effects.

Switch S3 454 is turned on when signal $U_2$ 462 is logic high and signal $U_1$ 455 is logic low, which results in a logic high signal $U_3$ 457. Voltage $V_H$ (driving voltage) is now coupled to the biasing capacitor 460 and the voltage at the gate of switch S3 454 is substantially the sum of the voltage $V_H$ and the difference between the first output voltage $V_{O1}$419 and the voltage drop $V_D$ of diode 461 (or mathematically: $V_H+(V_{O1}-V_D)$). The voltage $V_H$ is greater than the threshold voltage of switch S3 454, and switch S3 454 is therefore turned on.

Figure 5:
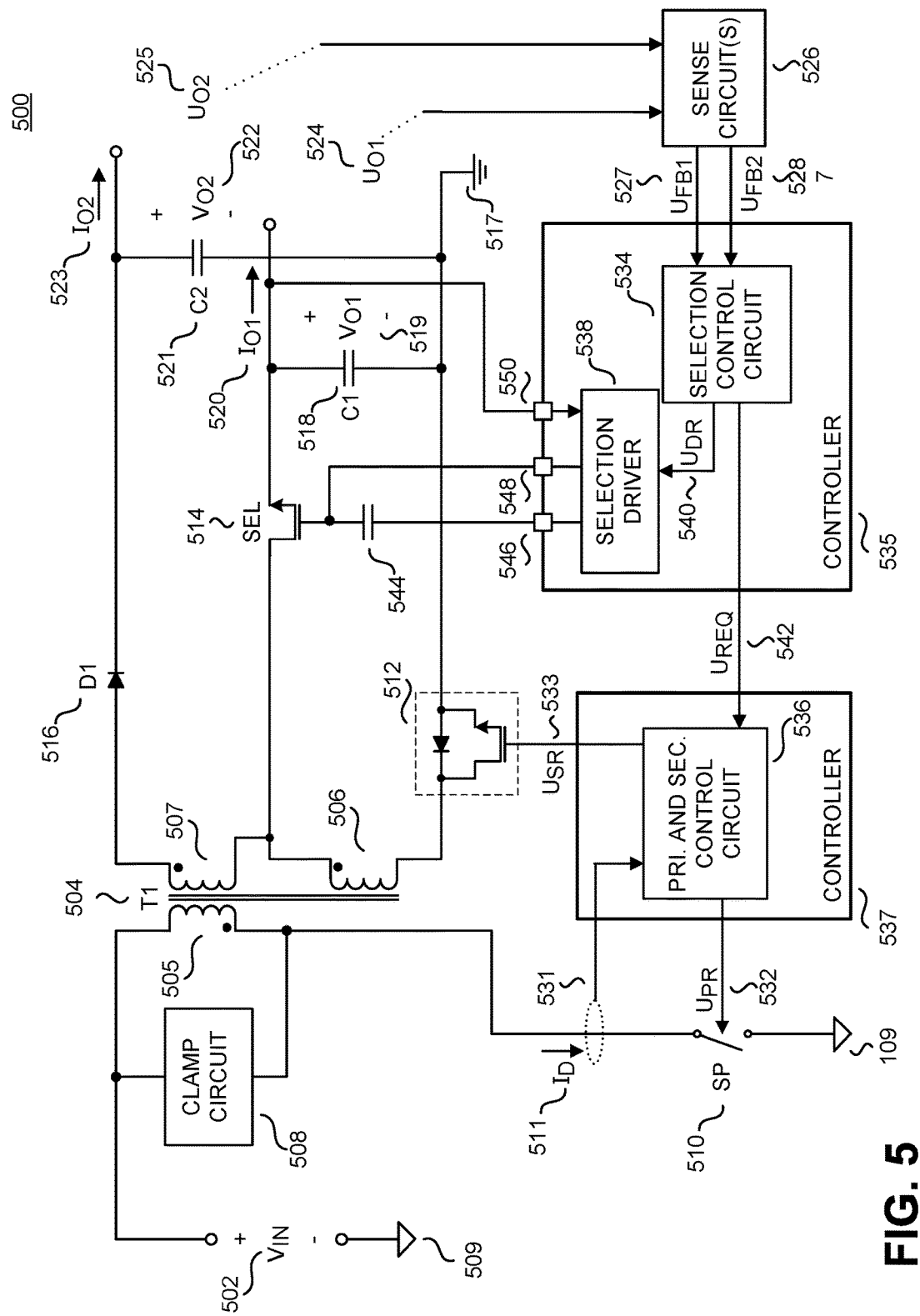
FIG. 5 illustrates another example of a power converter in a multi-output flyback configuration and controller, in accordance with an embodiment of the disclosure.

FIG. 5 illustrates another example of a power converter 500 in a multi-output flyback configuration including a controller 535 with a selection driver 538 in accordance with the teachings of the present disclosure. The example of the power converter 500 includes an energy transfer element 504, a primary winding 505 of the energy transfer element 504, secondary windings 506 and 507 of the energy transfer element 504, a clamp circuit 508, a power switch SP 510, an input return 509, output rectifiers 512 and 516, a selection switch S14, output capacitors C1 518 and C2 521, sense circuit(s) 526, a biasing capacitor 544 and controllers 535 and 537. Further, controller 535 is shown as including selection control circuit 534, selection driver 538, and terminals 546, 548, and 550. Controller 537 is shown as including primary and secondary control circuit 536.

Also shown in FIG. 5 are an input voltage $V_{IN}$ 502, first and second output voltages $V_{O1}$ 519 and $V_{O2}$ 522, first and second output currents $I_{O1}$ 520, $I_{O2}$ 523, first and second output quantities $U_{O1}$ 524 and $U_{O2}$ 525, first and second feedback signals $U_{FB1}$ 527 and $U_{FB2}$ 528, a switch current $I_D$ 511, a current sense signal 531, a primary drive signal $U_{PR}$ 532, a secondary drive signal $U_{SR}$ 533, a drive signal $U_{DR}$ 540, and a request signal $U_{REQ}$ 542. In the illustrated example, the power converter 500 is shown as having a flyback topology. It is appreciated that other known topologies and configurations of power converters may also benefit from the teachings of the present disclosure and that similarly named and numbered elements are coupled and function as described above.

The example power converter 500 shown in FIG. 5 is similar to the power converter 100 shown in FIG. 1, however rather than a single controller that includes the selection control circuit 534, selection driver 538, terminals 546, 548, and 550 and the primary and secondary control circuit 536, the example power converter 500 of FIG. 5 illustrates two separate controllers. Controller 535 is shown as including selection control circuit 534, selection driver 538, and terminals 546, 548, and 550, while controller 537 is shown as including primary and secondary control circuit 536. In the example shown, controller 535 sends the request signal $U_{REQ}$ 542 to controller 537 via a communication link. In the example shown, controllers 535 and 537 may be two separate packages. Controller 535 is its own package, which may include one or more integrated circuits for the selection driver 538 and the selection control circuit 534. Similarly, controller 537 is a separate package, which may include one or more integrated circuits for the primary and secondary control circuit. Further, power switch SP 510 may be integrated with controller 537.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A driver circuit for use in a controller, the driver circuit comprising:
   a signal generator configured to generate a first control signal, a second control signal, and a third control signal in response to a drive signal that is configured to control switching of a selection switch that is coupled to the driver circuit and referenced to an output voltage that is greater than a ground reference voltage;
   a first switch coupled to the signal generator, wherein the first switch is configured to selectively couple a first voltage to a first terminal of the controller in response to the first control signal, wherein the first voltage is a drive voltage that is greater than a threshold voltage of the selection switch;
   a second switch coupled to the signal generator, wherein the second switch is configured to selectively couple a second voltage to the first terminal of the controller in response to the second control signal, wherein the second voltage is substantially equal to the ground reference voltage; and
   a third switch coupled to the signal generator, wherein the third switch is configured to selectively couple a second terminal of the controller to a third terminal of the controller in response to the third control signal.

2. The driver circuit of claim 1, wherein the selection switch has first and second terminals and a control terminal, wherein the first terminal of the controller is to be coupled to a first end of a first biasing capacitor, wherein the second terminal of the controller is to be coupled to a second end of the first biasing capacitor and to the control terminal of the selection switch, wherein the third terminal of the controller is to be coupled to the output voltage and the second terminal of the selection switch, wherein the signal generator is configured to turn off the first switch, and turn on the second switch and the third switch to charge the first biasing capacitor to the output voltage when the selection switch is turned off, and wherein the signal generator is configured to turn on the first switch, and turn off the second switch and the third switch to apply a sum of the first voltage and a voltage across the first biasing capacitor to a gate terminal of the selection switch to turn on the selection switch.

3. The driver circuit of claim 2, wherein the third switch includes a first terminal coupled to the second terminal of the controller, a second terminal coupled to the third terminal of the controller, and a second control terminal, wherein the driver circuit further comprises:

a passive switch coupled between the second terminal of the third switch and the second control terminal of the third switch;

a second biasing capacitor having a first end coupled to the second control terminal of the third switch;

a fourth switch configured to selectively couple the first voltage to a second end of the second biasing capacitor in response to the second control signal;

a fifth switch configured to selectively couple the second voltage to the second end of the second biasing capacitor in response to the first control signal; and a sixth switch configured to selectively coupled the first end of the second biasing capacitor to a current source coupled to the second voltage in response to the first control signal.

4. The driver circuit of claim 1, wherein a leading edge of the drive signal is coupled to cause the second control signal and the third control signal to fall to a logic low value prior to the first control signal rising to a logic high value.

5. The driver circuit of claim 1, wherein a trailing edge of the drive signal is configured to cause the first control signal to a logic low value prior to the second control signal and the third control signal rising to a logic high value.

6. The driver circuit of claim 5, where the logic high value for the third control signal is less than the logic high value for the second control signal and the third control signal is referenced to the output voltage that is greater than the ground reference voltage.

7. A power converter, comprising:

an energy transfer element having a primary winding coupled to an input of the power converter and multiple secondary windings coupled to multiple outputs of the power converter;

a power switch coupled to the primary winding, wherein the power switch is configured to be switched to control a transfer of energy from the input of the power converter to the multiple outputs of the power converter in response to a plurality of feedback signals representative of the multiple output of the power converter;

a controller including a driver circuit, comprising:

a signal generator configured to generate a first control signal, a second control signal, and a third control signal in response to a drive signal that is configured to control switching of a selection switch that is coupled to the driver circuit and referenced to an output voltage of one of the multiple outputs of the power converter, wherein the output voltage is greater than a ground reference voltage;

a first switch coupled to the signal generator, wherein the first switch is configured to selectively couple a first voltage to a first terminal of the controller in response to the first control signal, wherein the first voltage is a drive voltage that is greater than a threshold voltage of the selection switch;

a second switch coupled to the signal generator, wherein the second switch is configured to selectively couple a second voltage to the first terminal of the controller in response to the second control signal, wherein the second voltage is substantially equal to the ground reference voltage of the multiple outputs of the power converter; and a third switch coupled to the signal generator, wherein the third switch is configured to selectively couple a second terminal of the controller to a third terminal of the controller in response to the third control signal.

8. The power converter of claim 7, wherein the controller further comprises a selection control circuit configured to generate the drive signal in response to the plurality of feedback signals.

9. The power converter of claim 8, further comprising a primary and secondary control circuit coupled to the selection control circuit, wherein the primary and secondary control circuit is configured to control the switching of the power switch, and configured to control switching of a synchronous rectifier coupled to one of the multiple secondary windings of the energy transfer element.

10. The power converter of claim 8, wherein the controller is a first controller, wherein the power converter further comprises a second controller including a primary and secondary control circuit, wherein the primary and second control circuit is coupled to the selection control circuit through a communication link, wherein the primary and second control circuit is configured to control the switching of the power switch, and configured to control switching of a synchronous rectifier coupled to one of the multiple secondary windings of the energy transfer element.

11. The power converter of claim 7, further comprising a first biasing capacitor having a first end and a second end, wherein the selection switch has first and second terminals and a control terminal, wherein the first terminal of the controller is to be coupled to a first end of a first biasing capacitor, wherein the second terminal of the controller is to be coupled to a second end of the first biasing capacitor and to the control terminal of the selection switch, wherein the third terminal of the controller is to be coupled to the output voltage and the second terminal of the selection switch, wherein the signal generator is configured to turn off the first switch, and turn on the second switch and the third switch to charge the first biasing capacitor to the output voltage when the selection switch is turned off, and wherein the signal generator is configured to turn on the first switch, and turn off the second switch and the third switch to apply a sum of the first voltage and a voltage across the first biasing capacitor to a gate terminal of the selection switch to turn on the selection switch.

12. The power converter of claim 11, wherein the third switch includes a first terminal coupled to the second terminal of the controller, a second terminal coupled to the third terminal of the controller, and a second control terminal, wherein the driver circuit further comprises:

a passive switch coupled between the second terminal of the third switch and the second control of the third switch;

a second biasing capacitor having a first end coupled to the second control terminal of the third switch;

a fourth switch configured to selectively couple the first voltage to a second end of the second biasing capacitor in response to the second control signal;

a fifth switch configured to selectively couple the second voltage to the second end of the second biasing capacitor in response to the first control signal; and a sixth switch configured to selectively coupled the first end of the second biasing capacitor to a current source coupled to the second voltage in response to the first control signal.

13. The power converter of claim 7, wherein a leading edge of the drive signal is configured to cause the second control signal and the third control signal to fall to a logic low value prior to the first control signal rising to a logic high value.

14. The power converter of claim 7, wherein a trailing edge of the drive signal is configured to cause the first control signal to a logic low value prior to the second control signal and the third control signal rising to a logic high value.

15. The power converter of claim 14, where the logic high value for the third control signal is less than the logic high value for the second control signal and the third control signal is referenced to the output voltage that is greater than the ground reference voltage.

16. A driver circuit for use in a controller, the driver circuit comprising:

a signal generator configured to generate a first signal, a second signal, and a third signal in response to a drive signal that is configured to control switching of a selection switch that is to be coupled to the driver circuit, wherein the selection switch is referenced to a reference voltage that is greater than a ground reference voltage;

a second switch configured to be controlled by the second signal and a third switch coupled to be controlled by the third signal, wherein the second switch and the third switch are controlled such that the reference voltage is substantially applied to a control terminal of the selection switch when the drive signal controls the selection switch to be off; and a first switch configured to be controlled by the first signal, wherein the first switch is controlled such that a sum of the reference voltage and a first voltage is substantially applied to the control of the selection switch when the drive signal controls the selection switch on.

17. The driver circuit of claim 16, wherein the second switch and the third switch are turned on and the first switch is turned off when the drive signal controls the selection switch to be off.

18. The driver circuit of claim 16, wherein the first switch is turned on and the second switch and third switch are turned off when the drive signal controls the selection switch to be on.

19. The driver circuit of claim 16, wherein a leading edge of the drive signal is configured to cause the second signal and the third signal to fall to a logic low value prior to the first signal rising to a logic high value.

20. The driver circuit of claim 16, wherein a trailing edge of the drive signal is configured to cause the first signal to a logic low value prior to the second signal and the third signal rising to a logic high value.

21. The driver circuit of claim 16, wherein the first switch, the second switch, and the third switch are controlled such that a voltage across a biasing capacitor is configured to the control of the selection switch is substantially equal to the reference voltage when the selection switch is turned off.

* * * * *